(No Model.)

G. S. CROSBY.
VEHICLE WHEEL.

No. 515,518. Patented Feb. 27, 1894.

Witnesses:
F. Gunter Wilhelm
Theo. L. Popp

Geo. S. Crosby  Inventor.
By Wilhelm & Bonner
Attorneys.

THE NATIONAL LITHOGRAPHING COMPANY,
WASHINGTON, D. C.

UNITED STATES PATENT OFFICE.

GEORGE S. CROSBY, OF BUFFALO, NEW YORK.

VEHICLE-WHEEL.

SPECIFICATION forming part of Letters Patent No. 515,518, dated February 27, 1894.

Application filed March 24, 1893. Serial No. 467,407. (No model.)

*To all whom it may concern:*

Be it known that I, GEORGE S. CROSBY, a citizen of the United States, residing at Buffalo, in the county of Erie and State of New York, have invented new and useful Improvements in Vehicle-Wheels, of which the following is a specification.

This invention relates to a vehicle wheel designed more especially for wheeled toys, although it is also desirable for other light vehicles.

The object of my invention is to produce a light wheel which runs noiselessly and which can be cheaply manufactured.

Figure 1:
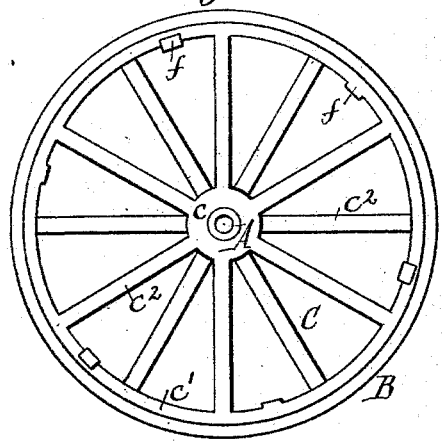
Figure 2:
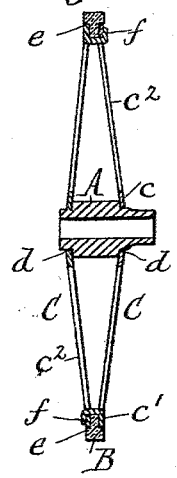
Figure 3:
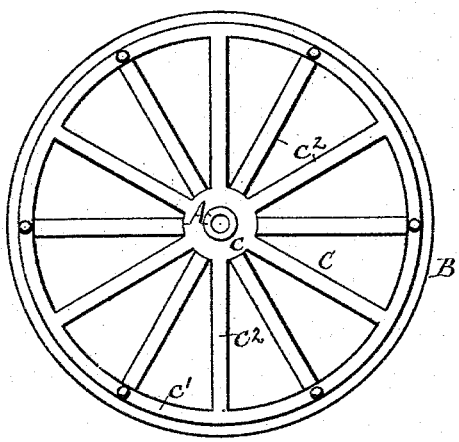
Figure 4:
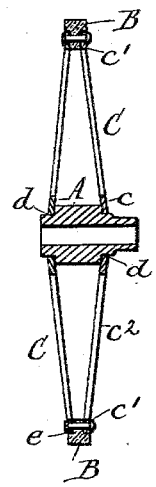
Figure 5:
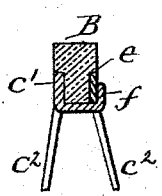

In the accompanying drawings:—Figure 1 is a side elevation of my improved wheel. Fig. 2 is a central cross-section thereof. Fig. 3 is a side elevation of a modified construction of the wheel. Fig. 4 is a cross section thereof. Fig. 5 is a fragmentary cross section, on an enlarged scale in line 5—5 Fig. 1.

Like letters of reference refer to like parts in the several figures.

A represents the hub of the wheel, B its rim or tire and C C the body or intermediate portion of the wheel. This body portion consists of two similar wheel-like sections or halves, each of which is stamped complete from a plate of steel or other sheet metal. Each of these sections consists of a central collar $c$ surrounding the hub A, a peripheral ring or rim-portion $c'$ and radial arms or spokes $c^2$ connecting said collar with said rim-portions. The hub is preferably constructed of cast metal and provided on opposite sides of its middle with annular shoulders $d$ against which the collars $c$ of the wheel sections bear and whereby the sections are held at the proper distance apart.

The tire B consists of a ring or band of rubber, leather or other sound-deadening material which is clamped between the rim-portions $c'$ of the two wheel sections and projects a sufficient distance beyond said rim-portions to prevent the latter from coming in contact with the floor. The tire is preferably recessed on opposite sides, from its inner edge to within a short distance of its outer edge, to form annular shoulders $e$. The flat rim portions of the metallic wheel-sections are seated in these recesses and the annular shoulders of the tire bear against the outer edges of said rim portions, thereby preventing displacement of the tire on the wheel sections. The recesses of the tire are preferably made as deep as the thickness of the rim-portions $c'$, so as to form a flush joint.

$f$ represents lips formed at suitable intervals on the inner edge of the rims of both wheel-sections whereby the two sections are firmly secured together. The lips of the two sections are preferably arranged alternately and the lips of one section are bent or clinched around the rim of the other section, so as to tightly clamp the tire between the same as shown in Fig. 2. These lips are stamped integrally with the wheel-sections. The two wheel-sections are so placed with reference to each other that their spokes alternate, as shown. The distance between the shoulders of the hub is somewhat greater than the thickness of the tire, so that in drawing the sections together for uniting them, they are dished in opposite directions, whereby the wheel is stiffened.

In constructing the wheel, the two stamped wheel-sections are first slipped over the hub. The tire is then seated between the rims of the sections, with its shoulders resting against the outer edges of the rims and it is then clamped between the rims by securely fastening the latter together by means of the clinching lips $f$.

If desired, the two wheel-sections may be secured together at their rims by any other suitable fastening, as, for instance, by transverse rivets passing through the rims and the interposed tire, as shown in Figs. 3 and 4.

My improved wheel is very cheaply produced, as the hub is readily cast, and its body sections being counter-parts, may be both stamped in the same dies at trifling cost. The wheel is especially suitable for toy carts, fire engines and similar wheeled toys, as it is practically noiseless and therefore renders such toys more desirable than those having wheels made wholly of metal, which, owing to the noise they produce, detract from the popularity of these toys.

I claim as my invention—

1. A wheel consisting of two similar body sections each formed of a single piece of metal and having a central opening, a straight sided rim portion and spokes connecting the central portion of the section with the rim portion, a separate cast metal hub arranged in the openings of said wheel sections and having annular shoulders against which the central portions of the wheel sections bear, a noiseless non-metallic tire arranged between the rim portions of the wheel sections and having flat outer sides which bear against the straight inner sides of said rim portions and fastenings connecting said rim portions, whereby the tire is clamped between the latter, substantially as set forth.

2. A wheel consisting of two similar sections each having a flat sided rim portion, and a tire clamped between said rim portions and provided in its outer sides with annular recesses receiving said rim portions and forming annular shoulders which bear against the periphery of the rim portions, substantially as set forth.

Witness my hand this 21st day of March, 1893.

GEORGE S. CROSBY.

Witnesses:
F. C. GEYER,
JOSEPHINE WILHELM.